United States Patent [19]
Klabunde et al.

[11] Patent Number: 5,759,939
[45] Date of Patent: Jun. 2, 1998

[54] COMPOSITE METAL OXIDE ADSORBENTS

[75] Inventors: Kenneth J. Klabunde; Abbas Khaleel, both of Manhattan, Kans.

[73] Assignee: Kansas State University Research Foundation, Manhattan, Kans.

[21] Appl. No.: 540,567

[22] Filed: Oct. 6, 1995

Related U.S. Application Data

[60] Continuation-in-part of Ser. No. 376,756, Jan. 23, 1995, abandoned, which is a division of Ser. No. 224,705, Apr. 8, 1994, abandoned.

[51] Int. Cl.$^6$ ................................................. B01J 23/58
[52] U.S. Cl. ........................... 502/328; 502/325; 502/331; 502/332; 502/335; 502/336; 502/337; 502/338; 502/340; 502/341; 502/345; 502/346
[58] Field of Search ........................ 502/328, 325, 502/331, 332, 385, 336, 337, 338, 340, 341, 345, 346

[56] References Cited

U.S. PATENT DOCUMENTS

| | | | |
|---|---|---|---|
| 4,360,504 | 11/1982 | Blanck et al. | 423/236 |
| 4,504,681 | 3/1985 | Armor | 502/323 |
| 5,021,383 | 6/1991 | Berty | 502/174 |
| 5,380,507 | 1/1995 | Hiltunen et al. | 423/240 S |

FOREIGN PATENT DOCUMENTS

| | | | |
|---|---|---|---|
| 4-118027 | 4/1992 | Japan | 423/240 S |

OTHER PUBLICATIONS

Berty et al. in "Oxidation and Removal of Chlorinated Hydrocarbons" *New Frontiers in Catalysis*, Jul. 19–24, 1992.

Gesser et al., "Aerogels and Related Poravs Materials" in *Chemical Reviews* vol. 89 No. 4, 1989 pp. 765–788 (no month).

*Primary Examiner*—Michael Lewis
*Assistant Examiner*—Stuart L. Hendrickson
*Attorney, Agent, or Firm*—Hovey, Williams, Timmons & Collins

[57] ABSTRACT

Finely divided composite materials are provided comprising a first metal oxide (e.g., MgO) at least partially coated with an extremely thin layer of a second metal oxide selected from the group consisting of the transition metal oxides such as $Fe_2O_3$. The composites are very effective for the destructive adsorption of undesirable fluids in gaseous or liquid form, such as chlorocarbons and chlorofluorocarbons. In use, a fluid stream including undesirable fluids are contacted with the composites of the invention, such as through the use of a filter containing the composite as a part of the filter media thereof.

11 Claims, 4 Drawing Sheets

COMPOSITE METAL OXIDE ADSORBENTS

RELATED APPLICATION

This is a continuation-in-part of application Ser. No. 08/376,756, filed Jan. 23, 1995, which is a division of Ser. No. 08/224,705, filed Apr. 8, 1994 both abandoned.

This invention was made with government support under Grant DAAH04-93-G-0328 awarded by the United States Army Research Office. The government has certain rights in the invention.

BACKGROUND OF THE INVENTION

1. Field of the Invention

The present invention is broadly concerned with finely divided (preferably nanoscale) composite materials which have significant utility in the destruction of chlorocarbons, fluorocarbons and other toxic or undesirable fluids. More particularly, the invention pertains to composite materials including first metal oxide particles, preferably MgO, at least partially coated with an extremely thin layer of a different second metal oxide such as a transition metal oxide, e.g., $Fe_2O_3$. Composites in accordance with the invention have greatly enhanced abilities to destructively adsorb undesirable fluids such as gases or liquids.

2. Description of the Prior Art

The increasing amounts of chlorocarbons and chlorofluorocarbons in the environment has given rise to the need to find easy and effective ways to destroy these gases without producing toxic byproducts. The most widespread groups of chlorinated compounds are the polychlorinated biphenyls (PCBS) which have extremely high thermal stabilities and are used as lubricants, heat transfer fluids, plasticizers, and transformer fluids; and cleaning solvents such as $CCl_4$, $CHCl_3$, and $C_2Cl_4$. Additionally, large stores of obsolete or overaged pesticides, herbicides, mixed wastes and nerve gases exist around the world, and the safe and effective destruction of these materials is of increasing concern.

These considerations have prompted a number of investigations to determine the most feasible way of handling and destroying various undesirable substances. Some of these destructive techniques involve incineration or catalytic oxidation. Another approach depends on surface active reagents that strip heteroatoms from the toxic gases and allow only the release of non-toxic hydrocarbons or carbon oxides. For example, the destructive adsorption of organophosphorus compounds on MgO causes the phosphorus atoms to be immobilized as a strongly bound residue, with the only volatile organic products being $CH_3OH$ and $HCOOH$. This same chemistry has been applied to the destruction of chlorocarbons using reactants such as MgO or CaO.

While destructive adsorption techniques appear promising and have favorable thermodynamics, the cost thereof has been considerable, owing principally to the fact that, to be effective, the adsorptive reagents must be very finely divided for maximum surface area. Moreover, these reactions are non-catalytic and depend entirely upon molecular reactions at the surface of the reagents.

This is accordingly a real and unsatisfied need in the art for improved destructive adsorption reagents which have enhanced destructive efficiencies.

SUMMARY OF THE INVENTION

The present invention overcomes the problems outlined above and provides finely divided composite materials useful for the destructive adsorption of a wide variety of undesirable compounds, which may be mixed with a solid phase (e.g., contaminated soils) or in fluids (i.e., materials in either gaseous or liquid form), such as chlorocarbons, chlorofluorocarbons, polychlorinated biphenyls, pesticides, herbicides, mixed wastes and nerve gases. Broadly speaking, the composites of the invention comprise finely divided particles of a first metal oxide support, such as those selected from the group consisting of MgO, CaO, $Al_2O_3$, $SnO_2$, $TiO_2$, and mixtures thereof, these particles being at least partially coated with a quantity of a second metal oxide different from the first metal oxide and selected from the group consisting of the transition metal oxides. Particularly preferred transition metal oxides include the oxides of titanium, vanadium, chromium, manganese, iron, copper, nickel and cobalt, such as $TiO_2$, $V_2O_3$, $Cr_2O_3$, $Mn_2O_3$, $Fe_2O_3$, $Cu_2O$, NiO, CoO and mixtures thereof.

In preferred forms, the first metal oxide is advantageously selected from the group consisting of MgO and CaO, whereas the second oxide is preferably $Fe_2O_3$, $TiO_2$, $V_2O_3$ and $Mn_2O_3$. For most efficient usages, the particles of the first metal oxide should be single crystallites or polycrystallite aggregations and should have an average size of up to about 20 nm, and more preferably from about 4–10 nm; the second metal oxide should be in the form of an extremely thin layer or coating applied onto the surface of the first metal oxide, giving an average overall size for the composite of up to about 21 nm, and more preferably from about 5–11 nm. The bulk composites of the invention should have an average surface area of at least about 15 $m^2/g$, and more preferably from about 30–600 $m^2/g$. More preferred ranges are from about 100–600 $m^2/g$ and most preferably from about 250–600 $m^2/g$.

Generally, the first metal oxide should be present in substantial excess relative to the second oxide. Thus, the first metal oxide comprises from about 60–49% by weight of the total composite material, and more preferably from about 75–99% by weight, and most preferably from about 95–99% by weight. Correspondingly, the second metal oxide should comprise from about 1–40% by weight of the total composite, and more preferably from about 1–25% by weight, and most preferably from about 1–5% by weight. The coverage of the first oxide by the second oxide should be quite extensive, e.g., at least about 75% of the surface area of the first metal oxide particles should be covered with the second oxide, and more preferably from about 90–100% of this surface area should be covered.

The composites of the invention are preferably fabricated by first forming the very finely divided first particulate material using known aerogel techniques. Thereafter, the second material is applied onto the surface of the first oxide as an extremely thin layer, e.g., a monolayer having a thickness on the order of less than 1 nm. For example, MgO nanoscale particles can be prepared, and are then treated with an iron salt such as iron III (acetylacetonate)$_3$ with the ligands being driven off by heating.

The composites of the invention can be used for the destruction of unwanted fluids, especially gases in a gas stream, although the invention is not limited to destruction of gases. The method may involve passing a fluid stream through a filtering device including the composite material therein. In practice, the concentration of the unwanted fluids should be from about 0.3–1.3 grams of the unwanted fluids for each gram of the composite material used for destructive adsorption. Generally, to be effective, the composites hereof should be heated during contact with the fluids to be destructively adsorbed. This elevated temperature should be at least about 300° C., and more preferably from about 400°–600° C., in the case of materials such as the chlorocarbons, fluorocarbons, organic heteroatom compounds (i.e., organic compounds having therein an atom other than carbon or hydrogen, for example meaning nitrogen, phosphorus, sulfur or a halogen) and nerve gases. In order to destructively adsorb other materials such as the PCBs, higher temperatures may be required on the order of 600°–800° C.

Although not wishing to be bound by any theory, it is believed that the second or outer oxide plays a catalytic role in the destructive adsorption process, via a mechanism referred to as spillover catalysis. For example, when $CCl_4$ attacks the surface of an $MgO/Fe_2O_3$ composite, it is believed that a disassociative adsorption occurs, probably with the intermediacy of chemisorbed $CCl_2$.

At this point, $COCl_2$ may form as an intermediate which goes on to react in a similar mode to produce $CO_2$ and $FeCl_x$. However, the important point is that the $FeCl_x$ formed must quickly exchange (spillover) $Cl^-$ with $O^{2-}$ in such a way that $Cl^-$ is driven into the bulk of the first oxide while $O^{2-}$ comes to the surface.

DETAILED DESCRIPTION OF THE PREFERRED EMBODIMENTS

The following examples illustrate preferred embodiments of the invention and use thereof. It is to be understood, however, that these examples are presented by way of illustration only and nothing therein should be taken as a limitation upon the overall scope of the invention.

EXAMPLE 1

A. Preparation of MgO

Highly divided nanoscale MgO samples were prepared by the autoclave treatment described by Utamapanya et al., *Chem. Mater.*, 3:175–181 (1991). In this procedure, 10% by weight magnesium methoxide in methanol solution was prepared and 83% by weight toluene solvent was added. The solution was then hydrolyzed by addition of 0.75% by weight water dropwise while the solution was stirred and covered with aluminum foil to avoid evaporation. To insure completion of the reaction, the mixture was stirred overnight. This produced an aerogel which was treated in an autoclave in using a glass lined 600 ml capacity Parr miniature-reactor. The gel solution was placed within the reactor and flushed for 10 minutes with nitrogen gas, whereupon the reactor was closed and pressurized to 100 psi using the nitrogen gas.

The reactor was then heated up to 265° C. over a 4 hour period at a heating rate of 1° C./min. The temperature was then allowed to equilibrate at 265° C. for 10 minutes.

At this point, the reactor was vented to release the pressure and vent the solvent (final reactor pressure was about 700 psi). Finally, the reactor was flushed with nitrogen gas for 10 minutes. This produced fine white powdery magnesium hydroxide having a surface area on the order of 1000 $m^2/g$ which was then thermally converted to MgO as explained below.

B. Preparation of $Fe_2O_3/MgO$ Composites

The $Mg(OH)_2$ particles were first thermally converted to MgO, followed by deposition of iron oxide to provide the complete composite. The apparatus employed for this operation is set forth in FIG. 1. This apparatus 10 includes a reactor 12 for holding a quantity of the powdered magnesium hydroxide, with a shiftable magnetic stirrer 14 positioned below the reactor and operable to rotate a stirrer bar 16. The apparatus further includes a mercury-filled 50 ml gas burette 18, manometers 20 and 21, a helium source 22 coupled with a molecular sieve 13X trap 24, and a septa 26 operably coupled with reactor 12. A vacuum line 28 is also provided which is coupled via conduit and valve assembly 30 to the remainder of the apparatus 10 as shown. Also, the reaction 12 is equipped with an external, electrically controlled heater 31.

Figure 1:
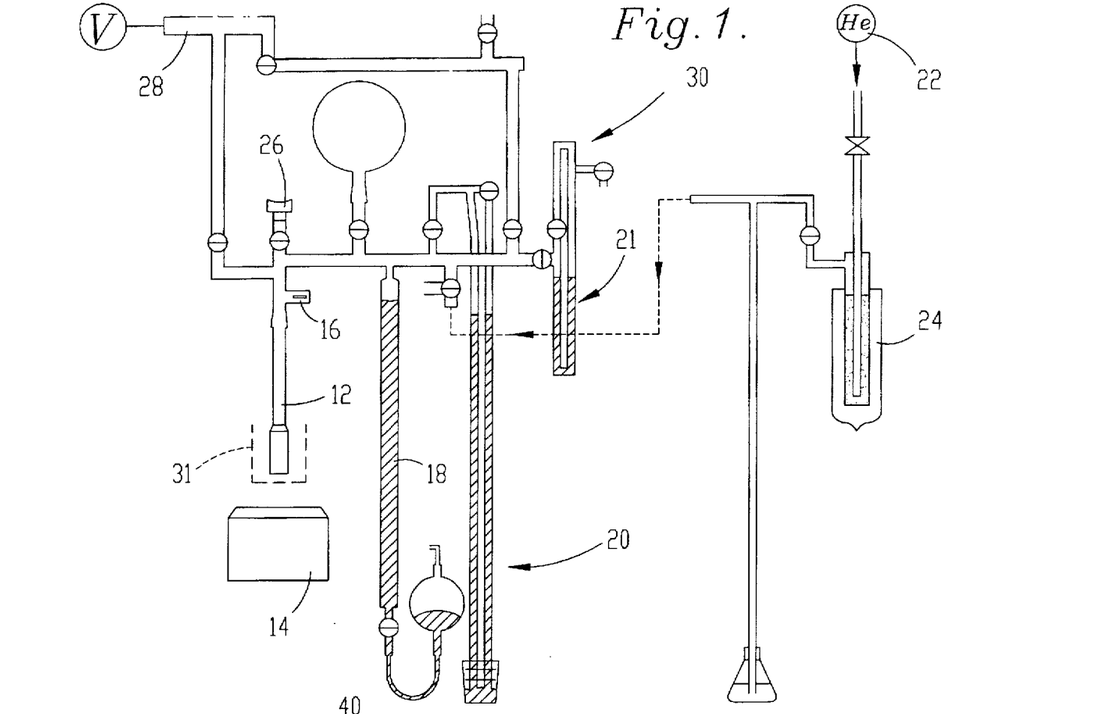
FIG. 1 is a schematic representation of the apparatus used in the production of $Fe_2O_3/MgO$ composites of the invention.

The initial thermal conversion of magnesium hydroxide to MgO was carried out by heating the magnesium hydroxide in reactor 12 under dynamic vacuum conditions at an ascending temperature rate to a maximum temperature of 500° C., which was held for 6 hours. Most of the dehydration was found to occur at temperatures between 200° C. and 320° C. IR and X-ray diffraction studies confirmed virtually complete conversion of the $Mg(OH)_2$ to MgO.

Iron oxide was deposited on the nanoscale MgO particles by carrying out a direct reaction between activated MgO and iron III (acetylacetonate)$_3$, in tetrahydrofuran at room temperature under helium (1 atm.).

In a typical preparation, 0.3 g of $Mg(OH)_2$ was heated under vacuum ($10^{-3}$ Torr.) in the reactor 12 at an ascending temperature rate of 1° C./min. to 500° C., which was held for 6 hours to assure complete conversion to MgO, followed by cooling to room temperature.

The evacuated system was then filled with He at 1 atm. pressure, and stirring was commenced using stirrer 14 and bar 16, the latter being magnetically shifted to the bottom of reactor 12. Two ml of 0.25M iron III (acetylacetonate)$_3$ in THF solution (previously prepared under argon by dissolving 4.5 g of iron III (acetylacetonate)$_3$ in 50 ml THF) was introduced to the reactor 12 by a syringe through a septa 26. The amount of iron III (acetylacetonate)$_3$ solution used provided the MgO surfaces with 1.4 iron III (acetylacetonate)$_3$ molecules for each surface OH group. The concentration of surface OH groups for the autoclave-prepared MgO was found to be 3.6 OH groups/nm$^2$. The reaction mixture in reactor 12 was stirred overnight to allow a complete reaction at room temperature. The reacted Fe$_2$O$_3$/MgO composite was then removed from the reactor 12, filtered using regular filter paper, washed with THF to remove any residuals of iron III (acetylacetonate)$_3$, and dried in air for 10 minutes.

IR spectra of the resultant dried product showed bands for the acetylacetonate species, indicating the existence of some acetylacetonate ligands bound to the surfaces of the MgO. This product was heated again under vacuum (10$^{-3}$ Torr.) at 500° C. to remove these ligands.

C. Chlorocarbon Decomposition Using MgO and the Fe$_2$O$_3$/MgO Composite

Two different studies were carried out to investigate and compare the efficiency of activated MgO and Fe$_2$O$_3$/MgO samples in decomposing CCl$_4$. Previous investigations using CaO for CCl$_4$ destruction indicated that the best decomposition occurs at 400° C. Therefore, in the following two systems, the reaction temperature was 400° C.

Figure 2:
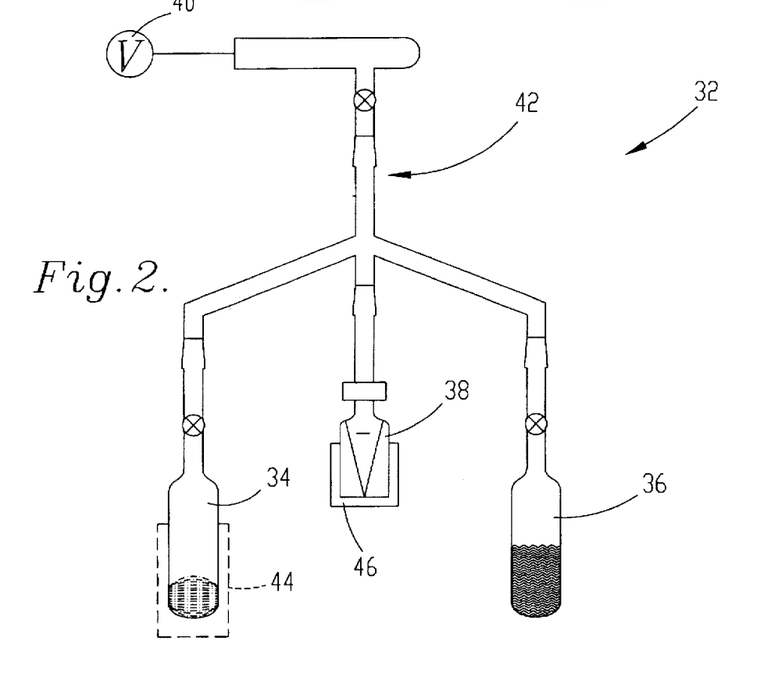
FIG. 2 is a schematic representation of apparatus used in the chlorocarbon decomposition tests using the composites of the invention.
Figure 3:
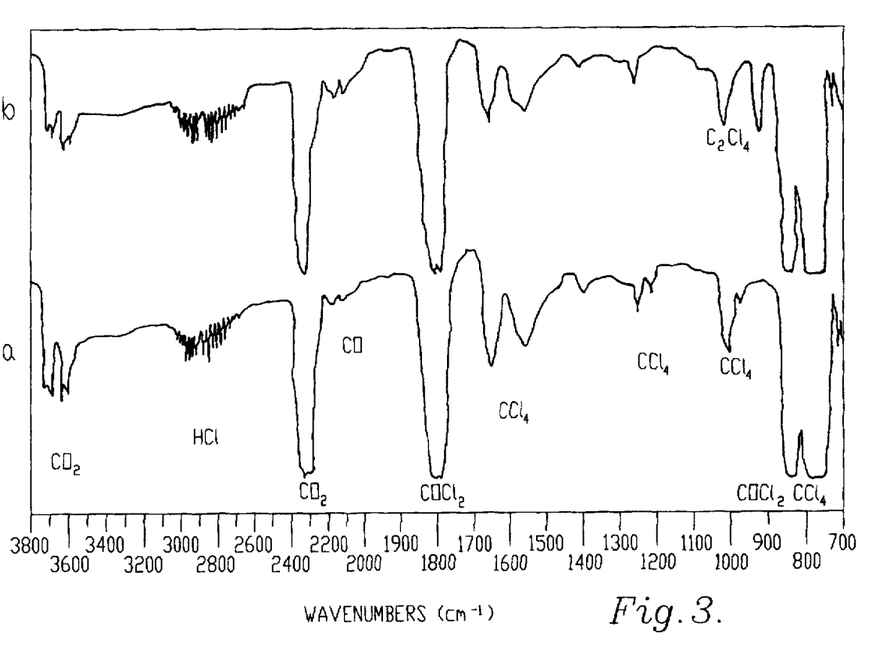
FIG. 3 is the infrared spectra of the gaseous products of $CCl_4$ reacted with MgO (Graph a) and $Fe_2O_3/MgO$ (Graph b), at a sample/$CCl_4$ molar ratio of 3:1.
Figure 4:
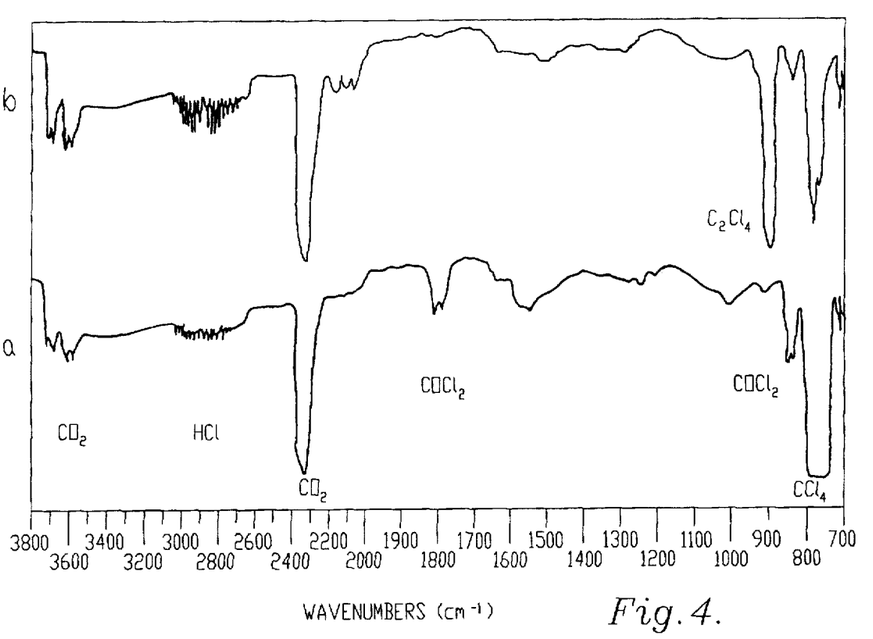
FIG. 4 is the infrared spectra of the gaseous products of $CCl_4$ reacted with MgO (Graph a) and $Fe_2O_3/MgO$ (Graph b), at a sample/$CCl_4$ molar ratio of 6:1.
Figure 5:
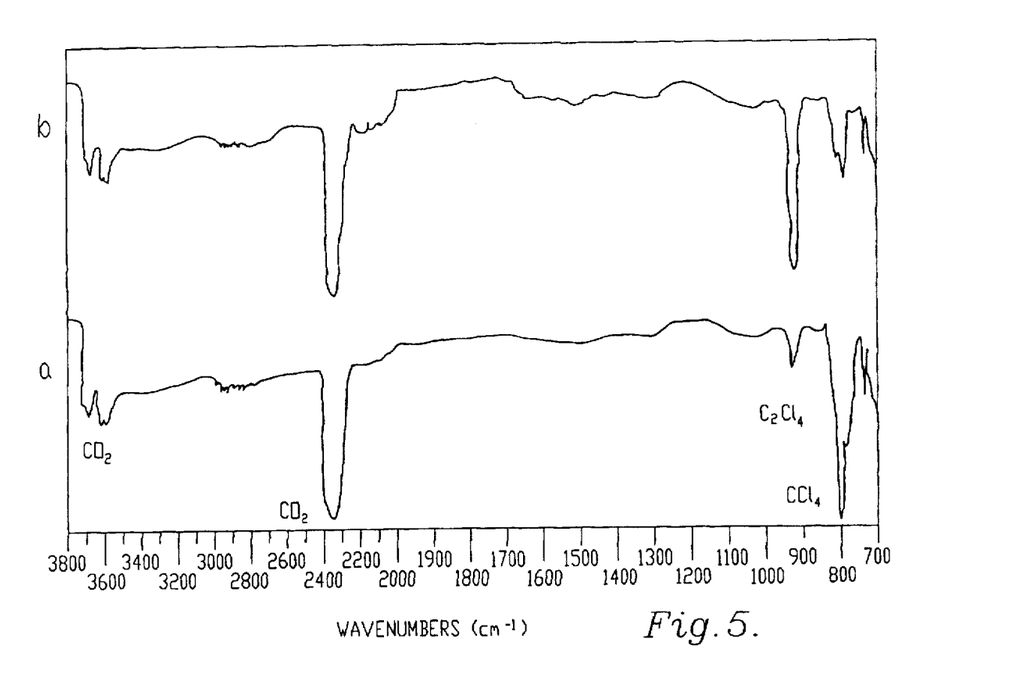
FIG. 5 is the infrared spectra of the gaseous products of $CCl_4$ reacted with MgO (Graph a) and $Fe_2O_3/MgO$ (Graph b), at a sample/$CCl_4$ molar ratio of 10:1.
Figure 6:
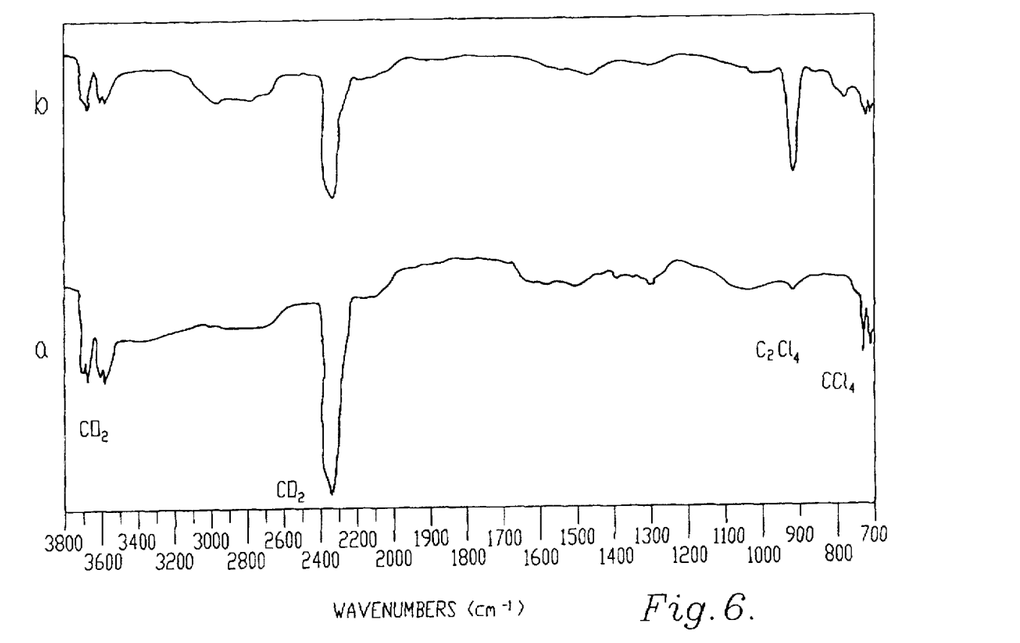
FIG. 6 is the infrared spectra of the gaseous products of $CCl_4$ reacted with MgO (Graph a) and $Fe_2O_3/MgO$ (Graph b), at a sample/$CCl_4$ molar ratio of 13:1.

In the first IR and XRD (X-Ray Diffraction) study, the apparatus of FIG. 2 was employed. This apparatus 32 included two Schlenk tubes 34, 36 respectively containing the MgO or Fe$_2$O$_3$/MgO composite and dry CCl$_4$, a calibrated 0.1 ml vial 38 and a vacuum source 40. A conduit and valve assembly 42 interconnected the source 40 with the tubes 34, 36 and vial 38 as shown. Also, tube 34 and vial 38 were equipped with external liquid nitrogen immersion containers 44, 46 for selective cooling of the contents of the tube 34 and vial 38.

In test procedures, the MgO or Fe$_2$O$_3$/MgO was heated by means not shown in FIG. 2 under vacuum (10$^{-3}$ Torr.) for complete activation (3 hours for a 0.2 g sample), with the CCl$_4$ vessel remaining closed via the appropriate valve. Next, 0.1 ml CCl$_4$ was collected in the calibrated vial 38 using external cooling via liquid nitrogen container 46, and by opening the valve adjacent the tube 36. After the CCl$_4$ was collected in vial 38, and tube 34 had sufficiently cooled, the external liquid nitrogen container 44 was employed to further cool the contents of tube 34, and the valve adjacent tube 34 was opened. This resulted in transfer of the CCl$_4$ from vial 38 to tube 34 (the above steps were repeated when more than 0.1 ml of CCl$_4$ was needed). In practice, different molar ratios of MgO or Fe$_2$O$_3$/MgO to CCl$_4$ were reacted for subsequent testing.

The tube 34 containing the MgO or Fe$_2$O$_3$/MgO and the added CCl$_4$ was closed and heated at 400° C. for 9 hours. Next, the CCl$_4$ tube 36 was replaced by an IR gas cell with KBr windows, followed by evacuation (10$^{-3}$ Torr.) of the system with the valve associated with tube 34 still closed. The tube 34 was then opened by opening the adjacent valve, in order to transfer the gases produced from the reaction to the IR cell. After each such experiment, an IR spectrum was recorded for the gaseous product, and an XRD spectrum was recorded for the solid products.

IR spectra of the gaseous products showed bands for CO$_2$, C$_2$Cl$_4$, COCl$_2$, CCl$_4$, and weak bands for HCl and CO gases (FIGS. 3–6). As indicated from the band intensities, the composition of these products changes as the sample/CCl$_4$ ratio changes. At low sample CCl$_4$ molar ratio 3:1), all of these gases are produced. As the ratio increases, the sample becomes in excess and decomposes all of the CCl$_4$ and the intermediate products, COCl$_2$ and HCl. Comparing the spectra of the MgO and Fe$_2$O$_3$/MgO reaction products, the following results are manifest.

1. The disappearance of COCl$_2$ (phosgene) in the case of Fe$_2$O$_3$/MgO was faster than in the case of MgO (FIG. 4) as the ratio was increased, which means that Fe$_2$O$_3$/MgO produces less phosgene at all ratios.

2. The production of C$_2$Cl$_4$ was generally higher in the reaction of Fe$_2$O$_3$/MgO.

3. The most striking feature was that the remaining (undecomposed) CCl$_4$ was less in reaction of Fe$_2$O$_3$/MgO as shown by the less intense bands of CCl$_4$ in the case of Fe$_2$O$_3$/MgO at all ratios, especially at ratios of 6:1 and 10:1.

These confirm that Fe$_2$O$_3$ composites are more efficient for destruction of CCl$_4$, in terms of decomposing more CCl$_4$, and producing less COCl$_2$ gas.

The X-Ray diffraction spectra of the solid products showed patterns for MgCl$_2$, hydrated MgCl$_2$ and MgO. The hydration of some MgCl$_2$ was due to the exposure of the samples to air during the XRD experiments. Comparing the spectra of the reaction products of the Fe$_2$O$_3$/MgO composite systems with the reaction products of the MgO systems, it was determined that:

1. At low molar ratios (3:1 and 6:1), MgO is a major component in the reaction products of the MgO systems, while it disappears almost completely in the reaction products of the Fe$_2$O$_3$/MgO systems.

2. Fe$_2$O$_3$/MgO systems produce more MgCl$_2$ than do the MgO systems, as shown by the stronger patterns of MgCl$_2$ in the spectra of the Fe$_2$O$_3$/MgO systems.

3. Thus, more CCl$_4$ reacted with the Fe$_2$O$_3$/MgO composites, as compared with the same amount of MgO, thereby confirming the greater efficiency of the Fe$_2$O$_3$/MgO composites.

In a second GC (gas chromatography) study, the gases produced from the rapid reaction between a series of 1 μL injections (2 min. apart) of CCl$_4$ through 0.1 g of MgO or Fe$_2$O$_3$/MgO composite at 400° C. For this test, a 0.1 g sample of MgO or Fe$_2$O$_3$/MgO composite was packed in a U-shaped stainless steel reactor using glass wool and glass beads on other side or the sample to hold it in place. The reactor was connected to the column of a GC instrument (TCD GC Series 580, GOW-MAC Instrument Co.), and heated to 400° C. over 1 hour. The instrument was calibrated at a column and injector temperature of 100° C. He was used as a carrier gas at a flow rate of 0.5 cm/s. CCl$_4$ was injected in 1 μL portions over the heated sample and the results were recorded after each injection for the gases coming out of the reaction tube.

The main gaseous products detected were CO$_2$, C$_2$Cl$_4$ and unreacted CCl$_4$, as identified by a mass spectrometer connected to the GC instrument. Gas chromatography was used to study the gaseous products of a short duration reaction between 0.1 g of MgO or Fe$_2$O$_3$/MgO and a series of 1 μL portions of CCl$_4$ injected over the sample at 400° C. allowing 2 minutes between injections. The main gaseous products detected were CO$_2$, C$_2$Cl$_4$, and the unreacted CCl$_4$ as identified by a mass spectrometer connected with a GC instrument in a separate system.

Figure 7:
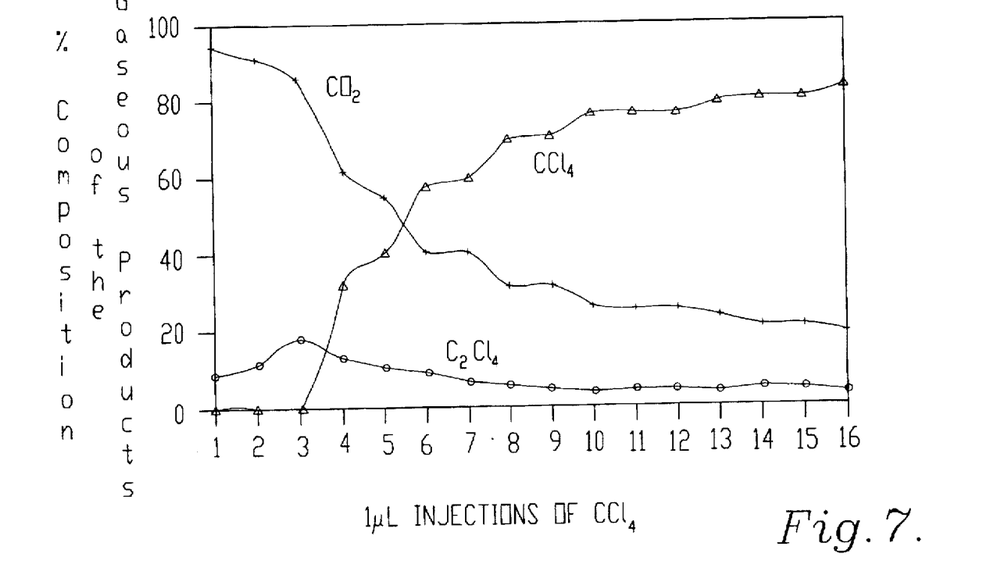
FIG. 7 is a gas chromatograph plot illustrating the percentage composition of gaseous products from the reaction between 0.1 g MgO and $CCl_4$ with respect to the microliters $CCl_4$ injected at 400° C. sample temperature.
Figure 8:
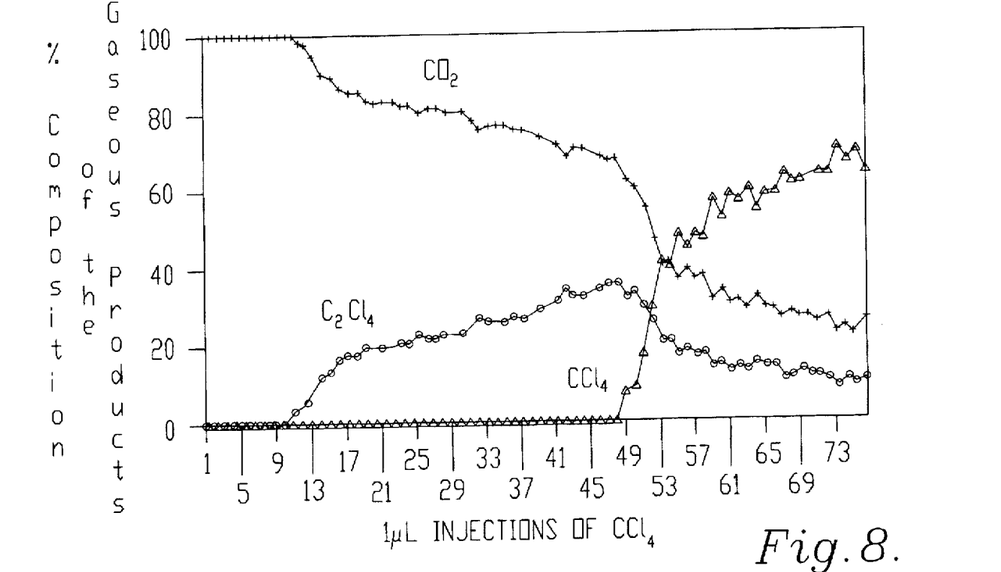
FIG. 8 is a gas chromatograph plot illustrating the percentage composition of gaseous products from the reaction between 0.1 g $Fe_2O_3/MgO$ and $CCl_4$ with respect to the microliters $CCl_4$ injected at 400° C. sample temperature.

Generally, CO$_2$ gas was the major product along with traces of C$_2$Cl$_4$ in the first few CCl$_4$ injections. After a certain number of injections, CCl$_4$ became in excess and started to appear with the reaction products. The concentration of CCl$_4$ increased slowly with injections of more CCl$_4$ until the sample was saturated and unable to decompose more CCl$_4$, as shown in FIGS. 7–8. As more CCl$_4$ was injected, the $CO_2$ and $C_2Cl_4$ production decreased but they continued to form after the saturation of the sample, which indicated that some decomposition continued to take place under these conditions. The results of two typical experiments using MgO and $Fe_2O_3$/MgO samples were illustrated in FIGS. 7 and 8, where the percent composition of the gaseous products is plotted with respect to the amount of $CCl_4$ injected. The percentage of each gas was measured by the percentage of its peak height after each injection.

The number of injections in which $CCl_4$ did not appear with the products gives the amount of $CCl_4$ completely decomposed by a 0.1 g sample. The efficiency of $Fe_2O_3$/MgO composites in decomposing $CCl_4$ was compared with that of MgO by carrying out the reaction with $CCl_4$ on the same amount of both samples (0.1 g) under the same conditions. In all of the experiments carried out, the difference in the behavior of both samples toward $CCl_4$ was great. In the MgO reaction (FIG. 7), $CCl_4$ was completely decomposed in the first 3 injections and the sample was saturated with 15 µL of $CCl_4$. In contrast, the $Fe_2O_3$/MgO sample was saturated with 75 µL of $CCl_4$ and 49 µL were completely decomposed. Depending on these results the sample/$CCl_4$ molar ratio for complete $CCl_4$ decomposition was 80:1 and 5:1 for MgO and $Fe_2O_3$/MgO respectively. In other words, to decompose 1 mole of $CCl_4$, we need 80 moles of MgO or 5 moles of $Fe_2O_3$/MgO. Another difference was that $C_2Cl_4$ was not produced from the first 10 injections in the $Fe_2O_3$/MgO system and $CO_2$ was the only product, while it was produced from the first injection in the MgO reaction. This confirms that the $Fe_2O_3$/MgO composites are very much more efficient in terms of decomposing $CCl_4$ and producing more $CO_2$, as compared with MgO.

D. Effect of Iron Content

The GC apparatus was also used to determine the effect of varying the iron content in the $Fe_2O_3$/MgO composites insofar as $CCl_4$ destruction is concerned. It was determined that the amount of iron deposited on the MgO surface increased the efficiency of the composites. Table 1 sets forth the amount of $CCl_4$ completely decomposed by $Fe_2O_3$/MgO composites having differing amounts of iron, where the GC experiments were carried out as set forth above.

TABLE 1

| % Fe (by weight) | µL of $CCl_4$ Completely Decomposed |
|---|---|
| 0 | 3 |
| 1.7 | 21 |
| 2.1 | 38 |
| 2.2 | 49 |

E. Effect of Other Reactants

The preferred $Fe_2O_3$/MgO composites were compared with other related samples by GC testing as described above. The other samples were: MgO mixed with iron III (acetylacetonate)$_3$ using different amounts of iron; MgO mixed with α-$Fe_2O_3$ using different amounts of iron; straight α-$Fe_2O_3$; and straight iron III (acetylacetonate)$_3$. Table 2 below sets forth the amounts of $CCl_4$ (in µL) completely decomposed by 0.1 g of different samples at 400° C.

TABLE 2

| Sample % Fe | 0% | 1.7% | 2.1% | 2.2% | 2.5% | 5.0% |
|---|---|---|---|---|---|---|
| $Fe_2O_3$/MgO | 3 | 21 | 38 | 49 | — | — |
| MgO/Fe(acac)$_3$ | 3 | — | — | 24 | — | 23 |
| MgO/α-$Fe_2O_3$[1] | 3 | — | — | — | 5 | — |
| α-$Fe_2O_3$ |  |  |  | 11 |  |  |
| Fe(acac)$_3$ |  |  |  | 13 |  |  |

[1] A physical mixture of separate MgO and α-$Fe_2O_3$ particles.

F. The Effect of Time Between Injections

The time between $CCl_4$ 1 µL injections in the GC test described above was found to have a significant influence on the efficiency of the $Fe_2O_3$/MgO composite samples in reacting with $CCl_4$. The results of this series of experiments, carried out using different time periods between $CCl_4$ injections, but with all other conditions constant, is set forth in Table 3.

TABLE 3

| Time (minutes) | µL of $CCl_4$ Completely Decomposed | |
|---|---|---|
|  | Sample A* | Sample B* |
| 2 | 24 | 30 |
| 5 | 40 | — |
| 10 | — | 60 |

The significant increase in the reactivity of $Fe_2O_3$/MgO toward $CCl_4$ by increasing the time between $CCl_4$ injections indicates that longer times help the sample to regenerate it surface structure and potential. This means that Cl/O exchange process goes toward completion if longer time is allowed. Based on these tests, the described spillover catalysis mechanism is proposed. When short time intervals between $CCl_4$ injections were used, two things might happen to inhibit the Cl/O exchange: first, the Fe—Cl/Fe—O exchange may not occur for all of the surface Fe—Cl bonds. Second, the exchange process would be expected to start with oxygen ions in the outer layers of MgO particles, which will be blocked with Cl ions after a short time, covering the bulk oxygen ions. When longer time intervals were used, these problems were somewhat alleviated: first, enough time was allowed for a complete Fe—Cl/Fe—O exchange on the surface; second, the Cl ions accumulating in the outer layers migrate over time, uncovering more $O^{-2}$ ions for the exchange process.

EXAMPLE 2

In this example, a CaO/$Fe_2O_3$ composite was prepared and tested for its ability to destructively adsorb chlorocarbons. The apparatus employed was identical to that shown in FIG. 1. Commercially available Ca(OH)$_2$ was first thermally activated to CaO under the dynamic vacuum and heating conditions recited in Example 1 to yield CaO having a surface area of about 100–120 m$^2$/g. The CaO was then stirred for several hours in a tetrahydrofuran solution of iron III (acetylacetonate)$_3$ under argon at the conditions of Example 1. The THF was then removed under vacuum, leaving an orange solid. This solid was heat treated again to 500° C. to drive off the acetylacetonate ligands. A gray/black powder resulted due to the carbon present. The composite was then stored and handled in a dry box to prevent reaction with moisture. X-ray diffraction studies of the sample detected from the atmosphere showed only the presence of CaO.

The CaO/Fe$_2$O$_3$ composite was tested for destructive adsorption of CCl$_4$ and found to be very efficient for this purpose.

EXAMPLE 3

In this example, a variety of composites in accordance with the invention were fabricated using MgO as the first metal oxide and with a variety of transition metal second oxides applied thereover. Each of the composites were made as described in Example 1 using the apparatus of FIG. 1; the outer transition metal oxide monolayer was present in the range of from about 1–5% by weight, with the total weight of MgO being taken as 100% by weight. In each instance, the acetylacetonate salt of the corresponding transition metal was prepared and used in the preparation technique.

Thereafter, the composites were tested to determine their efficiencies in the destructive adsorption of carbon tetrachloride. The gas chromatography test employed is described in Example 1 wherein 0.1 gram of each test composite were placed in the U-shaped reactor, and 1 μL injections of carbon tetrachloride were sequentially passed through the U-tube. In each case, a breakthrough number was determined along with the percentage of carbon tetrachloride destroyed in total. The breakthrough number was a measure of how many injections the composite could tolerate before any carbon tetrachloride broke through the bed, whereas the total carbon tetrachloride destroyed was a measure of the capacity of the composite. The following table sets forth the results of these tests:

TABLE 4

| Composite | Breakthrough Number | % CCl$_4$ Destroyed |
| --- | --- | --- |
| MgO (control) | 0 | 26 |
| MgO/TiO$_2$ | 3 | 64 |
| MgO/V$_2$O$_3$ | 16 | 70 |
| MgO/Cr$_2$O$_3$ | 2 | 42 |
| MgO/Mn$_2$O$_3$ | 13 | 63 |
| MgO/Fe$_2$O$_3$ | 7 | 55 |
| MgO/CoO | 4 | 45 |
| MgO/NiO | 4 | 44 |
| MgO/CuO | 5 | 46 |

The foregoing data is reproducible, with the breakthrough numbers being accurate within about ±2% and percent decomposition within about ±5%.

This example establishes that a variety of transition metal oxide coatings can be used to good effect as second or outer coatings in the composites of the invention.

EXAMPLE 4

In this example, a number of different preparation techniques were employed giving composites having significantly smaller surface areas, and these composites were tested to determine their efficiency in the destructive adsorption of CCl$_4$. A total of seven composites were made using MgO and CaO as the first metal oxide, and Fe$_2$O$_3$ and Mn$_2$O$_3$ as the second coating oxides; the second oxides were present as essential monolayers, constituting about 2% by weight of the overall composites.

In particular, composite 1 was a CaO/Fe$_2$O$_3$ composite made by obtaining commercially available CaO powder and placing the powder in boiling water for about 2–3 hrs. Thereafter, the boiled powder was collected on a filter and the powder was dried to remove bulk water in an oven at about 110° C. The CaO powder was then further dried by placing the powder in a 2 inch diameter quartz tube and positioning the latter within an oven at 450° C.; nitrogen gas heated to this same temperature was then passed through the tube for a period of 2–3 hrs. In the next step, the dried CaO powder was reacted with Fe(NO$_3$)$_3$ in water at room temperature. The reaction product was then filtered and dried using 450° C. nitrogen as described previously.

Composite 1 was tested by providing a flow chamber having sufficient volume to hold 100 grams of the composite. In order to prevent entrainment of the discrete particulate composite, it was weakly agglomerated by wetting and drying to form a cake. The cake was then manually broken into pieces and placed within the flow chamber. These pieces were very porous and if subjected to handling or finger pressure, would readily return to the powdered state. The average surface area of the composite in the broken pieces was about 30 m$^2$/g.

Composites 2 and 3 were respectively MgO/Fe$_2$O$_3$ and CaO/F$_2$e$_3$O composites each made by taking commercially available MgO and CaO powders, boiling the powders in water for about 2 hrs., and filtering. The filtrates were then heated in a vacuum ($10^{-3}$ Torr) to 500° C. The first oxide powders were then treated with Fe(acac)$_3$ in tetrahydrofuran at room temperature under helium (1 atm). The treated composites were then vacuum dried under the same conditions as the first oxide powders. Composites 2 and 3 (as well as Composites 4–7) were tested using the pulsed reactor/GC method described in Example 1 in order to determine the moles of CCl$_4$ destroyed per mole of first oxide, and to determine the breakthrough number, i.e., the number of pulses of CCl$_4$ required before CCl$_4$ broke through the test composite.

Composites 4 and 5 were likewise MgO/Fe$_2$O$_3$ and CaO/Fe$_2$O$_3$ composites. These were produced as described in Example 1, with the addition of vacuum drying of the starting first oxide (MgO or CaO), and final vacuum drying of the composite. In each case, the vacuum drying was up to 500° C. at a maximum vacuum of $10^{-3}$ Torr.

Composites 6 and 7 were made exactly as described with reference to Composites 4 and 5, but with a single first oxide (MgO) and different metal compounds to form the second oxide monolayers. In particular, composite 6 was formed using V(acac)$_3$, whereas Composite 7 was formed with Mn(acac)$_3$ to yield MgO/V$_2$O$_3$ and MgO/Mn$_2$O$_3$.

The following table sets forth the results of these tests.

TABLE 5

| Composite No. | Composite Surface Area (m$^2$/g) | CCl$_4$ Adsorbed[1] | Breakthrough No. |
| --- | --- | --- | --- |
| 1 (CaO/Fe$_2$O$_3$) | 30 | 0.31 | — |
| 2 (MgO/Fe$_2$O$_3$) | 185 | 0.23 | 8 |
| 3 (CaO/Fe$_2$O$_3$) | 90 | 0.44 | 2 |
| 4 (MgO/Fe$_2$O$_3$) | 450 | 0.36 | 28 |
| 5 (CaO/Fe$_2$O$_3$) | 130 | 0.51 | 9 |
| 6 (MgO/V$_2$O$_3$) | 230 | 0.46 | 64 |
| 7 (MgO/Mn$_2$O$_3$) | 290 | 0.42 | 62 |

[1]Moles of CCl$_4$ destroyed per mole of first oxide present. The results are average values based on numerous determinations. Maximum theoretical values for CaO and MgO are 0.50 based upon the reaction CCl$_4$ + 2 MO → CO$_2$ + 2 MCl$_2$.

The foregoing results demonstrate that composites in accordance with the invention have a significant capacity to adsorb $CCl_4$. In the case of Composite 5, the results are essentially stoichoimetric.

EXAMPLE 5

In this example, a series of $MgO/Fe_2O_3$ composites were compared using different $Fe_2O_3$ loadings and surface areas.

Composites were prepared by boiling of commercial MgO in water for about 2 hours to make a highly dispersed slurry of $MgO/Mg(OH)_2$, removal of the water, impregnation with $Fe(NO_3)_3(aq)$, filtration, and drying. This process yields $Fe(NO_3)_3/MgO$ that upon heat treatment yields $MgO/Fe_2O_3$. Table 6 summarizes the Phase I experimental results including loadings of $Fe_2O_3$, surface areas, crystallite sizes, and results of CCl destructive adsorption.

For the destructive adsorption studies, 0.1 g of each composite was placed in a U-tube reactor heated to 425° C. under helium flow. Then $CCl_4$ (either 1 μl or 4 μl pulses) was injected and the $CCl_4$ vapors pass through the destructive adsorbent bed. Reaction took place and $CO_2$ evolved from the bed. Repeated pulses eventually caused $CCl_4$ to break through the bed giving a breakthrough number. Continued CCl pulsing eventually partially exhausted the bed, and a % of $CCl_4$ decomposed could be determined. Using this methodology, optimal performance based on iron loadings was determined, by maximizing both the breakthrough number and the % of $CCl_4$ decomposed. Thus, $CCl_4$ proved to be an excellent model, giving a clean reaction to form essentially one volatile producer, $CO_2$. These results are given in Table 6.

It was concluded that a loading of about 20% of $Fe_2O_3$ gives the best results. However, surface areas decline for heavier loadings of $Fe_2O_3$. It should be noted that when loadings of about 10% by weight are exceeded, some $Fe_2O_3$ moves in the bed, and is lost, probably as $FeCl_3$. This complication may be sufficiently important that maximum $Fe_2O_3$ loadings would be kept to up to about 10% by weight.

TABLE 6

| $Fe_2O_3$ Loading (wt. %) | Surface area ($m^2/g$) | MgO Crystallite size (nm) | Breakthrough[a] number | % $CCl_4$ decomposed[b] |
|---|---|---|---|---|
| 0 | 150–200 | 5.6 | 1 | 25 |
| 1[c] | — | — | 1 | 26(19)[e] |
| 2[c] | 185 | — | 2 | 35(27)[e] |
| 13[c] | 95 | 11 | 2 | 54(73)[e] |
| 13[d] | 50 | 10 | 3 | 64(56)[e] |
| 23[c] | 115 | 10 | 6 | 87(81)[e] |
| 23[d] | 90 | 11 | 3 | 68(32)[e] |
| 38[d] | 35 | 12 | 1 | 71(37)[e] |
| 77[d] | 25 | 16 | 1 | 94(54)[e] |

[a]Number of 1 μl pulses of $CCl_4$ before any $CCl_4$ broke through (±1).
[b]After 50 μl has been pulsed (±5).
[c]Water removed by filtration.
[d]Water removed by evaporation.
[e]4 μl injected at a time.

We claim:

1. A composite material comprising particles of a first metal oxide selected from the group consisting of MgO, CaO, $Al_2O_3$, $SnO_2$ and $TiO_2$, said first metal oxide being at least partially coated with a quantity of a second metal oxide different than said first metal oxide and selected from the group consisting of $TiO_2$, $V_2O_3$, $Cr_2O_3$, $Mn_2O_3$, $Fe_2O_3$, $Cu_2O$, CoO and mixtures thereof, said composite having a surface area of at least about 15 $m^2/g$ and an average particle size of up to about 21 nm.

2. A composite material comprising particles of a first metal oxide selected from the group consisting of MgO and CaO at least partially coated with a quantity of a second metal oxide comprising $Fe_2O_3$, said composite having a surface area of at least about 15 $m^2/g$.

3. The composite material of claim 2, said first metal oxide being MgO.

4. The composite material of claim 2, said surface area being from about 30–600 $m^2/g$.

5. The composite material of claim 2, said composite having an average size of up to about 21 nm.

6. The composite material of claim 5, said average size being from about 6–11 nm.

7. A composite material comprising particles of a first metal oxide selected from the group consisting of MgO, CaO, $Al_2O_3$, $SnO_2$ and $TiO_2$, said first metal oxide being at least partially coated with a quantity of a second metal oxide different than said first metal oxide and selected from the group consisting of oxides of titanium, vanadium, chromium, manganese, iron, copper, nickel and cobalt, said composite having a surface area of from about 250–600 $m^2/g$, said particles having an average particle size of up to about 20 nm.

8. A composite material comprising particles of a first metal oxide selected from the group consisting of MgO, CaO, $Al_2O_3$, $SnO_2$ and $TiO_2$, said first metal oxide being at least partially coated with a quantity of a second metal oxide different than said first metal oxide and selected from the group consisting of oxides of titanium, vanadium, chromium, manganese, iron, copper, nickel and cobalt, said composite having a surface area of from about 250–600 $m^2/g$, said first metal oxide comprising from about 75–99% by weight of the total composite material.

9. A composite material comprising particles of a first metal oxide selected from the group consisting of MgO, CaO, $Al_2O_3$, $SnO_2$ and $TiO_2$, said first metal oxide being at least partially coated with a quantity of a second metal oxide different than said first metal oxide and selected from the group consisting of oxides of titanium, vanadium, chromium, manganese, iron, copper, nickel and cobalt said composite having a surface area of from about 250–600 $m^2/g$, said second metal oxide comprising from about 1–25% by weight of the total composite material.

10. A composite material comprising particles of MgO, said MgO being at least partially coated with a quantity of $Fe_2O_3$, said composite having a surface area of from about 250–600 $m^2/g$.

11. A composite material comprising particles of a first metal oxide selected from the group consisting of MgO, CaO, $Al_2O_3$, $SnO_2$ and $TiO_2$, said first metal oxide being at least partially coated with a quantity of a second metal oxide different than said first metal oxide and selected from the group consisting of oxides of titanium, vanadium, chromium, manganese, iron, copper, nickel and cobalt said composite having a surface area of from about 250–600 $m^2/g$, said second metal oxide being present as a layer having a thickness of up to about 1 nm.

* * * * *